US006228945B1

(12) United States Patent
Kennedy et al.

(10) Patent No.: US 6,228,945 B1
(45) Date of Patent: May 8, 2001

(54) THREE ARM STAR COMPOSITIONS OF MATTER HAVING DIBLOCK ARMS BASED ON POLYISOBUTYLENE AND METHODS OF PREPARATION

(75) Inventors: Joseph P. Kennedy, Akron, OH (US); Balazs Keszler, Budapest (HU); Györgyi Fenyvesi, Stow, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 09/467,576

(22) Filed: Dec. 20, 1999

(51) Int. Cl.$^7$ ............................ C08L 25/10; C08F 293/00
(52) U.S. Cl. ...................... 525/241; 525/267; 526/213; 526/216; 526/348.7
(58) Field of Search ................................... 525/241, 267; 526/213, 216, 348.7

(56) References Cited

U.S. PATENT DOCUMENTS

| | | |
|---|---|---|
| 3,280,084 | 10/1966 | Zelinski . |
| 4,342,849 | 8/1982 | Kennedy . |
| 4,485,210 | 11/1984 | Neiditch et al. . |
| 4,497,748 | 2/1985 | Vitus et al. . |
| 4,524,188 | 6/1985 | Kennedy et al. . |
| 4,814,405 | 3/1989 | Kennedy . |
| 4,870,144 | 9/1989 | Noda et al. . |
| 4,929,683 | 5/1990 | Kennedy et al. . |
| 4,952,644 | 8/1990 | Wardle et al. . |
| 5,066,730 | 11/1991 | Kennedy et al. . |
| 5,102,966 | 4/1992 | Higashimura et al. . |
| 5,122,572 | 6/1992 | Kennedy et al. . |
| 5,164,477 | 11/1992 | Kobayashi et al. . |
| 5,169,914 | 12/1992 | Kaszas et al. . |
| 5,225,492 | 7/1993 | Kennedy et al. . |
| 5,248,746 | 9/1993 | Shimokawa et al. . |
| 5,395,885 | 3/1995 | Kennedy et al. . |
| 5,428,111 | 6/1995 | Faust et al. . |
| 5,804,664 | 9/1998 | Kennedy et al. . |

OTHER PUBLICATIONS

J.M. Yu, PH. Dubois, PH. Teyssie, and R. Jerome, "Syndiotactic Poly(methyl methacrylate) (sPMMA)–Polybutadiene (PBD)–sPMMA Triblock Copolymers Synthesis, Morphology, and Mechanical Properties," Macromolecules, p. 6090–6099, (1996).

Timea M. Marsalko, Istvan Majoros, and Joseph P. Kennedy, "Multi–Arm Star Polyisobutylenes" Macromol. Symp., p. 39–56, (1995).

T.M. Marsalko, I. Majoros, and J.P. Kennedy, "Multi–arm Star Polyisobutylenes," Polymer Bulletin, p. 665–672, (1993).

Joseph P. Kennedy, Louis R. Ross and Oskar Nuyken, "New Telechelic Polymers and Sequential Copolymers by Polyfunctional Initiator–transfer Agents (Inifers)," Polymer Bulletin, p. 5–10, (1981).

Jin–Shan Wang and Krzysztof Matyjaszewski, "Controlled/ "Living" Radical Polymerization. Halogen Atom Transfer Radical Polymerization Promoted by a Cu(I)/Cu(II) Redox Process," Macromolecules, p. 7901–7910, (1995).

Timothy E. Patten and Krzysztof Matyjaszewski, "Atom Transfer Radical Polymerization and the Synthesis of Polymeric Materials," Advanced Materials, p. 901–915, (1998).

Bela Ivan, Joseph P. Kennedy, and Victor C. Chang, "New Telechelic Polymers and Sequential Copolymers by polyfunctional Initiator–Transfer Agents (Inifers).," Journal of Polymer Science: Polymer Chemistry Edition, p. 3177–3191, (1980).

Lech Wilczek and Joseph P. Kennedy, "Electrophilic Substitution of Organosilicon Compounds.," Journal of Polymer Science: Part A: Polymer Chemistry, vol. A, p. 3255–3265, (1987).

Melissa A. Sherman and Joseph P. Kennedy, "Novel Polyisobutylene/Poly(dimethylsiloxane) Bicomponent Networks. I. Synthesis and Characterization," Journal of Polymer Science: Part A: Polymer Chemistry, vol. 36, p. 1891–1899, (1998).

A. Nagy, R. Faust, and J.P. Kennedy, "Inifers New Telechelic Polymers and Sequential Copolymers by PolyFunctional Initiator Transfer Agents (Inifers)," Polymer Bulletin, vol. 13, p. 97–102, (1985).

R. Faust and J.P. Kennedy, "Living Carbocationic Polymerization," Journal of Polymer Science: Part A: Polymer Chemistry, vol. 25, p. 1847–1869, (1987).

David M. Haddleton, Dax Kukulj, Dacid J. Duncalf, Alex M. Heming, and Andrew J. Shooter, "Low–Temperature Living "Radical" Polymerization (Atom Transfer Polymerization) of Methyl Methacrylate Mediated by Copper(I) N–Alkyl–2–Pyridylmethanimine Complexes," Macromolecules, p. 5201–5205, (1998).

(List continued on next page.)

Primary Examiner—James J. Seidleck
Assistant Examiner—Olga Asinovsky
(74) Attorney, Agent, or Firm—Renner, Kenner, Greive, Bobak, Taylor & Weber (57) ABSTRACT

The present invention relates to compositions of matter comprising a trifunctional aromatic core, said core having three arms radiating therefrom, wherein each of said arms is a diblock copolymer comprising an inner segment of polyisobutylene connected to a outer polymer segment obtained by a living radical polymerization process. The present invention also provides a process of preparing a composition of matter comprising the steps of: providing a trifunctional aromatic initiator core; reacting the trifunctional aromatic core with isobutylene to form a macroinitiator, said macroinitiator comprising polyisobutylene functionalized at the terminus of each said arm; conducting site transformation at the terminus of each arm to introduce a group capable of initiating living radical polymerization of outer segments at the terminus of each arm; performing living radical polymerization to form the outer polymer segments to produce a three arm star composition of matter having three diblock copolymer arms.

18 Claims, 6 Drawing Sheets

OTHER PUBLICATIONS

R.N. Keller and H.D. Wycoff, "Inorganic Synthesis," p. 1–9, (1947).

Joseph P. Kennedy, Jack L. Price, and Katsuo Koshimura, "Novel Thermoplastic Elastomer Triblocks of a Soft Polyisobutylene Midblock Connected to Two Hard PMMA Stereocomplex Outer Blocks," Macromolecules, vol. 24, p. 6567–6571, (1991).

Joseph P. Kennedy and Jack L. Price, "Synthesis, Characterization and Physical Properties of Poly(Methyl Methacrylate–b–Isobutylene–b–Methyl Methacrylate) Triblock Copolymers," Poly. Mat. Sci. Eng., p. 40–41, (1991).

Joseph P. Kennedy and Jack L. Price, "Poly(methyl methacrylate–block–polyisobutylene–block–poly(methyl methacrylate) Thermoplastic Elastomers," American Chemical Society Symp., p. 258–277, (1992).

THREE ARM STAR COMPOSITIONS OF MATTER HAVING DIBLOCK ARMS BASED ON POLYISOBUTYLENE AND METHODS OF PREPARATION

The present invention was made in the course of research that was supported by National Science Foundation (NSF) Grant DMR-94-23202.

TECHNICAL FIELD OF THE INVENTION

The present invention relates to novel three arm star compositions of matter. The present invention more particularly relates to three arm star thermoplastic compositions of matter comprising an aromatic core having multiple arms radiating from the core, each arm having an inner segment of polyisobutylene connected to outer polymeric segments. Methods of preparation, and adhesive and coating compositions comprising the novel three arm star thermoplastic composition of matter are also provided.

BACKGROUND OF THE INVENTION

The synthesis of linear triblock thermoplastic elastomers, such as PMMA-b-PIB-b-PMMA, is widely known. J. P. Kennedy, J. L. Price and K. Koshimura, "Novel Thermoplastic Elastomer Triblocks of Soft Polyisobutylene Mid-Block Connected to Two Hard Stereocomplex Outer-Blocks", *Macromolecules,* Vol. 24, p. 6567 (1991); J. P. Kennedy and J. L. Price, "Synthesis, Characterization and Physical Properties of Poly(methyl methacrylate-b-isobutylene-b-methyl methacrylate) Triblock Copolymers", Vandenberg Symposium, *Polym. Mat. Sci. Eng.* Vol. 64, 40–41 (1991); and J. P. Kennedy and J. L. Price, "Poly (methyl methacrylate)-block-Polyisobutylene-block-Poly (methyl methacrylate) Thermoplastic Elastomers: Synthesis, Characterization, and Some Mechanical Properties", ACS *Symp. Ser.* #496, pages 258–277 (1992).

It is generally recognized, however, that three arm star molecules exhibit more advantageous viscosity properties and mechanical properties than linear triblock molecules.

Recently, the synthesis of various multi-arm radial or star polymers has become of growing practical and theoretical interest to a variety of industries. Such star polymers are seen as useful as surfactants, lubricants, rheology modifiers, viscosity modifiers, adhesives and coatings. In fact, star polymers are now considered by many to be state-of-the-art viscosity modifiers and oil additives, although the potential of some of these star polymers for these applications is still being evaluated and tested.

For example, there has been a growing interest in star polymers consisting of multiple polyisobutylene (PIB) arms. Kennedy et al., U.S. Pat. No. 5,395,885 describes the synthesis of star polymers having multiple PIB arms and polydivinylbenzene (PDVB) cores using cationic, "arm-first", synthesis techniques. Because the structure of PIB contains no unsaturation, these PIB-based stars are believed to be useful for a variety of applications such as motor oil additives and viscosity index improvers.

In addition, star polymers, formed by the "core first" method, having multiple arms radiating from the core are also disclosed in the prior art. For example, U.S. Pat. No. 5,804,664 to Kennedy et al. discloses star polymers comprising a core component selected from the group consisting of a p-methoxy cumyl group and a calix[n]arene where n=4 to 16; and N number of arms containing at least one segment of polyisobutylene connected to said core component, where N=1 when said core component is said p-methoxy cumyl group and N=n, when said core component is said calix[n] arene. The star polymers of the this reference have only arm emanating from each aromatic ring.

It is desirable in the art to provide thermoplastic elastomer star compositions of matter having improved mechanical and thermal properties. While the preparation of star polymers is known in the art, heretofore, it has not been known to prepare three-arm star compositions of matter comprising an aromatic core and three diblock arms, each arm having inner and outer polymeric segments, wherein the outer segments of each diblock arm are obtained by living radical polymerization.

SUMMARY OF THE INVENTION

It is, therefore, an object of the present invention to provide a three arm star composition of matter having diblock arms radiating from a single aromatic core, each arm having an inner segment of polyisobutylene connected to an outer polymer segment, the outer polymer segment obtained by living radical polymerization.

It is another object of the present invention to provide a method for the preparation of a three arm star composition of matter having diblock arms radiating from a single aromatic core, each arm having an inner segment of polyisobutylene connected to an outer polymer segment, the outer polymer segment obtained by living radical polymerization.

It is another object of the present invention to provide a thermoplastic elastomer comprising a three arm star composition of matter having diblock arms radiating from a single aromatic core, each arm having an inner segment of polyisobutylene connected to an outer polymer segment, the outer polymer segment obtained by living radical polymerization.

It is another object of the present invention to provide adhesive compositions comprising a three arm star composition of matter having diblock arms radiating from a single aromatic core, each arm having an inner segment of polyisobutylene connected to an outer polymer segment, the outer polymer segment obtained by living radical polymerization.

It is another object of the present invention to provide coating compositions comprising a three arm star composition of matter having diblock arms radiating from a single aromatic core, each arm having an inner segment of polyisobutylene connected to an outer polymer segment, the outer polymer segment obtained by living radical polymerization.

These and other objects, together with the advantages thereof over the linear and star thermoplastic compositions of matter and methods of preparation known in the existing art, which shall become apparent from the specification which follows, are accomplished by the invention as hereinafter described and claimed.

The present invention, therefore, provides a thermoplastic elastomer composition of matter comprising a trifunctional aromatic core, said core having three arms radiating therefrom, wherein each of said arms is a diblock copolymer comprising an inner segment of polyisobutylene connected to an outer polymer segment, and wherein the outer segment is obtained by a living radical polymerization process.

In one embodiment, the present invention provides a thermoplastic elastomer composition of matter comprising a trifunctional aromatic core, said core having three arms radiating therefrom, wherein each of said arms is a diblock copolymer comprising an inner segment of polyisobutylene connected to a bromine-capped outer polymer segment, the composition represented by Formula (I):

(I)

wherein $R_1$–$R_6$ are the same or different and are selected from the group consisting of hydrogen, methyl, ethyl and phenyl;

wherein A connects the inner segments of polyisobutylene to the outer polymer segments and is selected from and wherein R7 is selected from hydrogen and methyl;

and wherein B is the outer polymer segment of each arm, wherein the outer segment is a polymer selected from the group consisting of polyacrylates, polymethacrylates, polyacrylonitrile, and polymethacrylonitrile.

The present invention also provides a process of preparing a composition of matter comprising the steps of providing a trifunctional aromatic core; reacting the trifunctional aromatic core with isobutylene to form a macroinitiator having three arms, said macroinitiator comprising polyisobutylene functionalized at the terminus of each arm; conducting site transformation at the terminus of each arm to introduce a group capable of initiating living radical polymerization of outer polymer segments at the terminus of each arm; performing living radical polymerization to form the outer polymer segments at the terminus of each arm, thereby producing a three arm star composition of matter having three diblock copolymer arms.

The present invention also provides thermoplastic elastomers comprising a trifunctional aromatic core, said core having three arms radiating therefrom, wherein each of said arms is a diblock copolymer comprising an inner segment of polyisobutylene connected to an outer polymer segment, and wherein the outer polymer segment of each arm is obtained by a living radical polymerization process.

The present invention further provides adhesive compositions comprising a trifunctional aromatic core, said core having three arms radiating therefrom, wherein each of said arms is a diblock copolymer comprising an inner segment of polyisobutylene connected to an outer polymer segment, and wherein the outer polymer segment of each arm is obtained by a living radical polymerization process.

The present invention further provides a coating composition comprising a trifunctional aromatic core, said core having three arms radiating therefrom, wherein each of said arms is a diblock copolymer comprising an inner segment of polyisobutylene connected to an outer polymer segment, and wherein the outer polymer segment of each arm is obtained by a living radical polymerization process.

DETAILED DESCRIPTION OF THE INVENTION

Novel three-arm star thermoplastic elastomers with arms based on polyisobutylene have been synthesized. In general, the present invention is directed to the production or synthesis of novel thermoplastic elastomeric compositions of matter, each having a structure comprising a first component, referred hereinafter as the "core". The "core" component is connected to three arm components, hereinafter referred to as "arm" or "arms". The "arms" of the novel thermoplastic compositions of matter each comprise a diblock copolymer, having an inner segment of polyisobutylene and an outer polymer segment. The outer polymer segment is prepared at the reactive terminus of each arm by living radical polymerization.

The inner segment of the diblock arms comprises a cationic polymerizable monomer, such as polyisobutylene. The glassy outer segments of the diblock arms may comprise any monomers polymerizable by living radical polymerization including, but not limited to acrylates, methacrylates, including, but not limited to, methyl methacrylate, 2-hydroxyethyl methylmethacrylate, 2-(dimethylamino)ethyl methacrylate, polyacrylonitrile, polymethacrylonitrile, and styrene.

In a preferred embodiment of the present invention, the outer segment of each diblock copolymer arm of the three arm star composition is a methacrylate polymer, such as poly(methyl methacrylate).

To assist with the understanding of the present invention, a glossary of terms, symbols, and definitions that are used throughout the specification are provided below.

The term "$M_n$", as used throughout this specification, refers to the number average molecular weight of the three arm star compositions of the present invention, or constituents of the three arm stars, such as the core, the macroinitiators, or the diblock arms.

The term "$M_w$", as used throughout this specification, refers to the weight average molecular weight.

The term "$M_w/M_n$", as used throughout this specification, refers to the molecular weight distribution.

The term "glassy" refers to materials that have a $T_g$ that is above room temperature.

The symbol "Ø", as used throughout the specification, represents an aromatic core.

In a preferred embodiment, the present invention provides a composition of matter comprising a trifunctional aromatic core, said core having three arms radiating therefrom, wherein each of said arms is a diblock copolymer comprising an inner segment of polyisobutylene connected to an outer polymer segment, the composition represented by formula (I):

(I)

wherein $R_1$–$R_6$ are each independently selected from the group consisting of hydrogen, methyl, ethyl, and phenyl; wherein A connects the inner segments of polyisobutylene to the outer polymer segments and is selected from (II)

and (III)

wherein R7 is selected from hydrogen and methyl;
and wherein B represents the outer polymer segments, wherein the outer segments of each arm is a polymer selected from the group consisting of polyacrylates, polymethacrylates, polyacrylonitrile and polymethacrylonitrile.

The present invention also provides a process for the preparation of a thermoplastic elastomer composition of matter comprising providing a trifunctional aromatic initiator core having three arms radiating form the core, wherein each arm has a reactive terminus. The isobutylene is polymerized by living carbocationic polymerization to form polyisobutylene at the reactive terminus of each arm. Site transformation is then conducted at the reactive terminus of each arm to induce polymerization of the glassy outer polymer segments.

As described hereinabove, the composition of matter of the present invention comprises an aromatic initiator that is trifunctional. The aromatic initiator of the composition of matter of the present invention can be any aromatic core that initiates the living cationic polymerization of isobutylene to polyisobutylene. According to one method of preparation described in the present invention, the aromatic core comprises a trifunctionalized tricumyl core, represented by formula (IV) below:

(IV)

wherein X is —Cl, —Br, —OH, —OCH$_3$, —OCH$_2$CH$_3$, and —OCOCH$_3$.

In a preferred method of preparation, the aromatic core is a tricumyl core having three —Cl$^t$ functionalities at the terminus of each arm. Site transformation is conducted at the reactive terminus of each arm, converting the —Cl$_t$ terminus of each arm to a —O—CO—C(CH$_3$)$_2$—Br terminus at each arm by a three step process, to induce living radical polymerization of the glassy outer polymer segments.

The first step of the process involves the conversion of the —Cl$^t$ terminus of each arm to either a —CH$_2$—CH=CH$_2$— or —CH(CH$_3$)=CH$_2$ group. The —CH$_2$—CH=CH$_2$ or —CH(CH$_3$)=CH$_2$ group is then converted to an —OH group at the terminus of each arm. The —O—CO —C(CH$_3$)$_2$—Br functionality was introduced to the terminus of each arm by esterification of each —OH group by 2-bromo-isobutyryl bromide.

The three arm star thermoplastic composition of matter of the present invention has superior mechanical properties as compared to linear thermoplastic elastomers of the prior art. The three arm star thermoplastic composition of matter of the present invention has a tensile strength of up to about 25 MPa, and an elongation of up to about 250 percent.

The present invention will be further described with respect to the three arm star-block composition of matter comprising an aromatic core and three diblock copolymers comprising polyisobutylene-b-poly(methyl methacrylate) diblock arms radiating from an aromatic core.

The three arm star composition of matter of the present invention comprises an aromatic core having three diblock arms radiating from the aromatic core, each of the three diblock arms comprises an inner segment of polyisobutylene connected to an outer segment of poly(methyl methacrylate). In general, the synthesis comprises three steps, namely 1) the synthesis of trifunctional polyisobutylene by living cationic polymerization of isobutylene mediated by the initiator, wherein the polyisobutylene of each arm has a functional reactive terminus, 2) conversion of the reactive terminus of each arm to isobutyryl bromide groups, and 3) initiation of living radical polymerization of methyl methacrylate at the reactive terminus of each arm. In order to better understand the polymerization reaction of the present embodiment, the following reaction scheme is provided:

The length ($M_n$'s) of the inner polyisobutylene segments and the glassy outer segments of each diblock arm can be controlled by controlling the conditions of the living cationic polymerization of isobutylene and the living radical polymerization of the glassy outer segments, respectively.

The mechanical properties of the three-arm star thermoplastic elastomers of the present invention have comparable or improved mechanical properties as compared to linear or star block elastomers existing in the art.

The compositions of the present invention can be used for any applications that traditionally utilizes thermoplastic elastomers, including, but not limited to adhesive and coating compositions comprising the thermoplastic composition of matter disclosed herein.

GENERAL EXPERIMENTATION

The following examples are set forth to describe the thermoplastic elastomers of the present invention in further detail and to illustrate the methods of the present invention. However, the examples should not be construed as limiting the present invention in any manner. Throughout this specification and claims, all percentages are by weight and are based on the total thermoplastic elastomer composition weight unless otherwise specifically stated.

A. Synthesis of the Macroinitiator The Ø(PIB—OCO—C(CH$_3$)$_2$Br)$_3$ macroinitiator was synthesized. The synthesis of the three-arm star allyl-telechelic polyisobutylene and its functionalization to hydroxyl-telechelic polyisobutylene (PIB(OH)$_3$) was carried out by the methods disclosed by R. Faust and J. P. Kennedy, J. Polym. Sci., Part A: Polym. Chem., 25, 1847 (1987); A. Nagy, R. Faust and J. P. Kennedy, Polym. Bull., 13, 97 (1985); M. A. Sherman, J. P. Kennedy, J. Polym. Sci., Part A: Polym. Chem., 36, 1891

(1998); L. Wilczek and J. P. Kennedy, J. Polym. Sci., part A: Polym. Chem., 25, 3255 (1987); and B. Ivan, J. P. Kennedy and V. S. C. Chang, J. Polym. Sci. Polym. Chem. Ed. 18, 3177 (1980), all of which are incorporated herein by reference.

Briefly, PIB(OH)$_3$ was dissolved in 200 milliliters of dry $CH_2Cl_2$ under $N_2$, and 15 times molar excess of $NEt_3$ was added. Subsequently, 15 times molar excess of 2-bromo-isobutyryl bromide (20% solution in dry $CH_2Cl_2$) was introduced dropwise to the polymer solution. The polymer charge was stirred at ambient temperature under $N_2$ for 24 hours. The solvent was evaporated, the polymer was dissolved in hexanes, precipitated in methanol (MeOH), dissolved in hexanes again, and washed with water, methanol and water. The solution was dried over anhydrous $MgSO_4$ overnight, filtered, and evaporated. The molecular weight of the polymer was determined by GPC and the functionality of the polymer was determined by $^1$H-NMR spectroscopy. The two Ø(PIB—OCO—C(CH$_3$)$_2$Br)$_3$ macroinitiators were characterized by a Mn=9,200 g/mol and a Mw/Mn=1.15, and a Mn=15,000 g/mol and a Mw/Mn=1.09, respectively.

B. Synthesis of Three Arm Star-Block Ø(PIB-b-PMMA)$_3$

The synthesis of three arm star-block Ø(PIB-b-PMMA)$_3$ was conducted. Equimolar amounts of the Ø(PIB—OCO—C(CH$_3$)$_2$Br)$_3$ macroinitiator, Cu$^{(1)}$X (CuBr or CuCl), Cu$^{(0)}$, MeOPhOH and twice the molar excess of a ligand (N-(n-penyl)-2-pyridylmethanimine), together with various amounts of methyl methacrylate and 20 milliliters of anhydrous toluene were placed into a 3-neck round bottom flask equipped with a thermometer, a magnetic stirring bar, and an condenser. Oxygen was removed from the charge by three freeze-pump-thaw cycles and the solution was stirred under $N_2$ at 40° C. The charge was diluted with tetrahydrofuran (THF) to facilitate the removal of colored copper complexes by filtration. The polymer was prepcipitated into methanol/water (1/1), filtered, and dried. Table I, below, shows the compositions of the charges and the reaction parameters.

Figure 2:
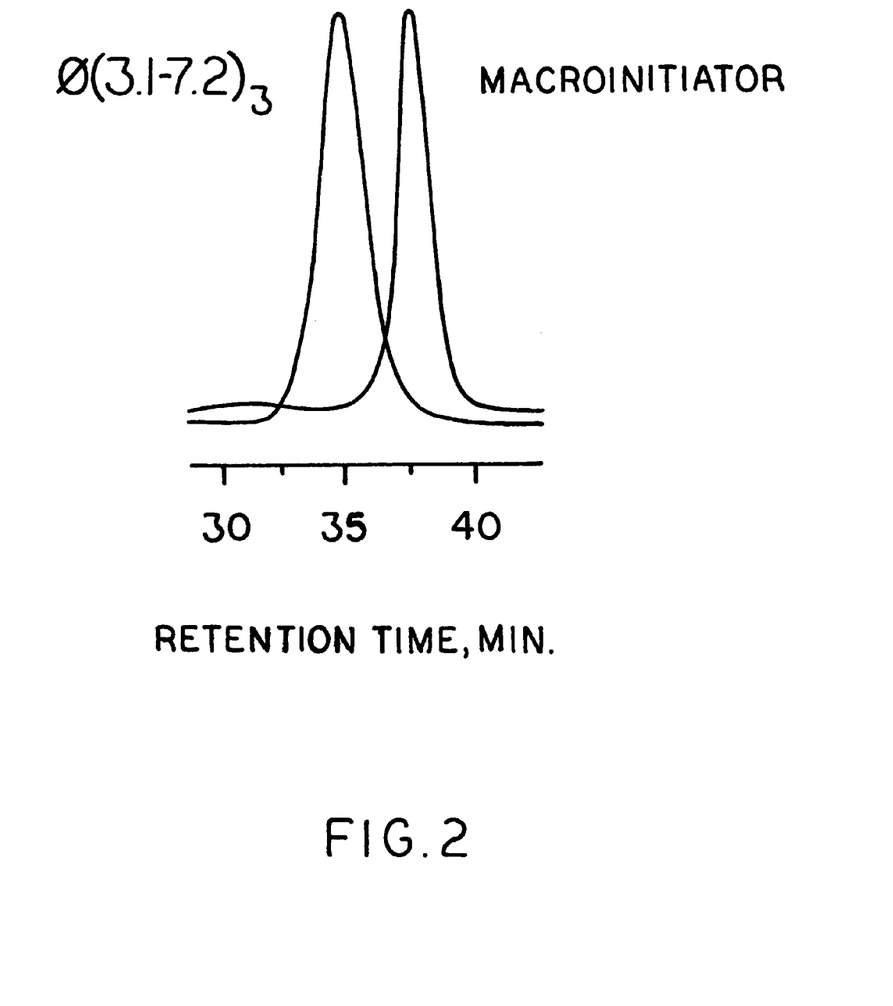
FIG. 2 is graph depicting traces of a macroinitiator having a $M_n$=9,200 g/mol and a representative three arm star polymer, namely $\emptyset(3.1–7.2)_3$ star-block copolymer as measured by GPC.

FIG. 2 shows the GPC traces of the macroinitiator of $M_n$=9,200 g/mol and the Ø(3.1–7.2)$_3$.

Figure 3:
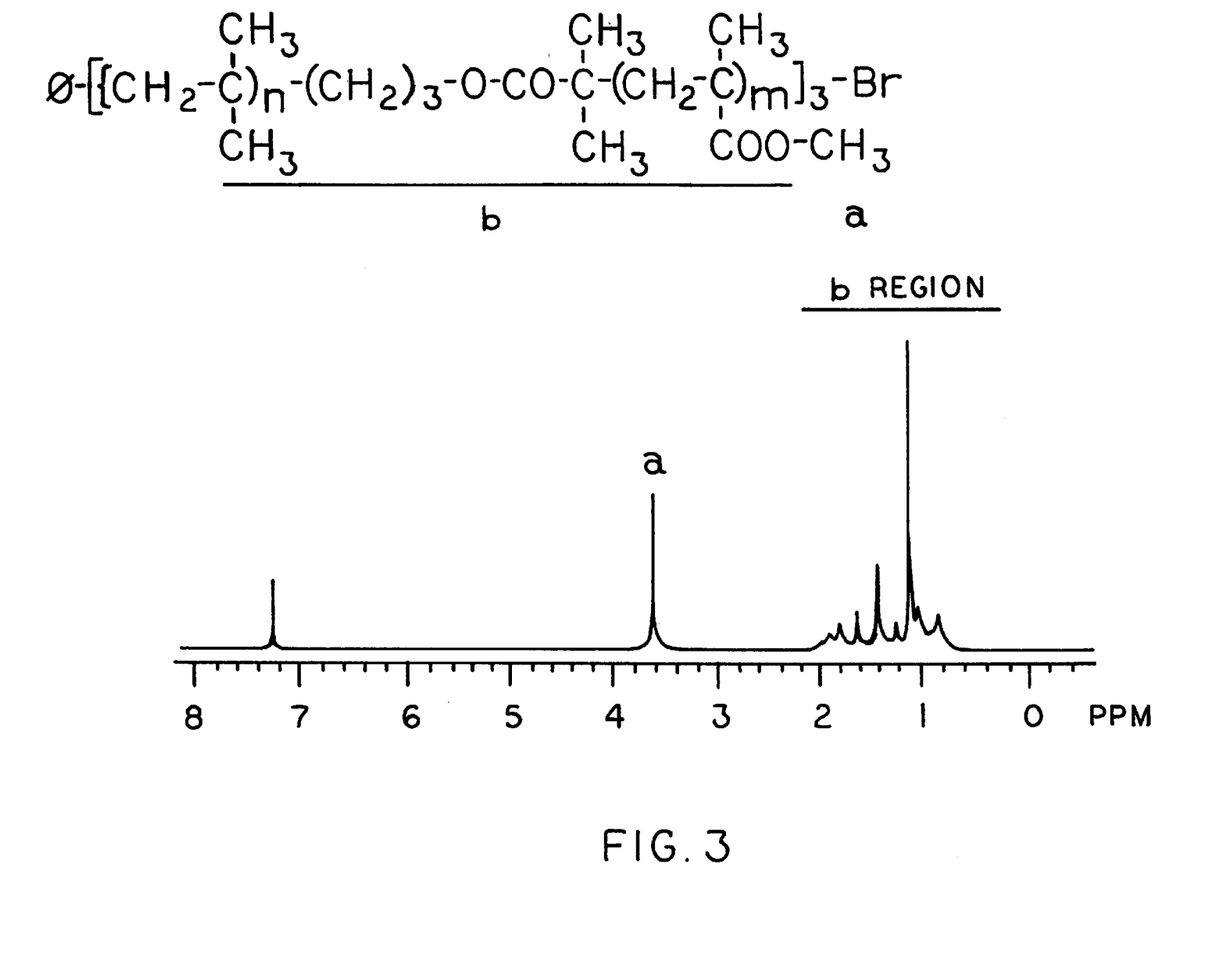
FIG. 3 is the $^1$H-NMR spectrum of a representative three arm star polymer, namely, $\emptyset(3.1–2.6)_3$ star-block polymer comprising 63 weight percent polyisobutylene (PIB).

FIG. 3 show the $^1$H-NMR spectrum for a representative three arm star thermoplastic composition of matter of the present invention, namely Ø(3.1–2.6)$_3$ star having 63 weight percent of polyisobutylene incorporated therein. The area of resonance in the regions from δ=0.6–2.0 and δ=3.6 prove the diblock structure of each arm of the three arm star thermoplastic compositions of matter of the present invention.

The core-destruction technique described by J. P. Kennedy, L. R. Ross and O. Nuyken, Polym. Bull., Vol. 5, p.5 (1981), was utilized to prove that the thermoplastic star compositions of the present invention have exactly three arms. The $M_n$ of an intact Ø(PIB-b-PMMA)$_3$ was determined. The aromatic core of the Ø(PIB-b-PMMA)$_3$ was destroyed by selective oxidative degradation, and the molecular weight of the surviving PIB-b-PMMA arms were measured. For example, the molecular weights of the surviving arms of a representative Ø(PIB-b-PMMA)$_3$, namely Ø(3.1–7.2)$_3$ having $M_n$=30,900 g/mol and $M_w/M_n$=1.50 was determined. After destruction of the tricumyl initiator core, three fragments having $M_n$=10,600 g/mol and Mw/M$_n$=1.89 were obtained. This data demonstrates the three arm star structure of the thermoplastic composition of the present invention.

Figure 4:
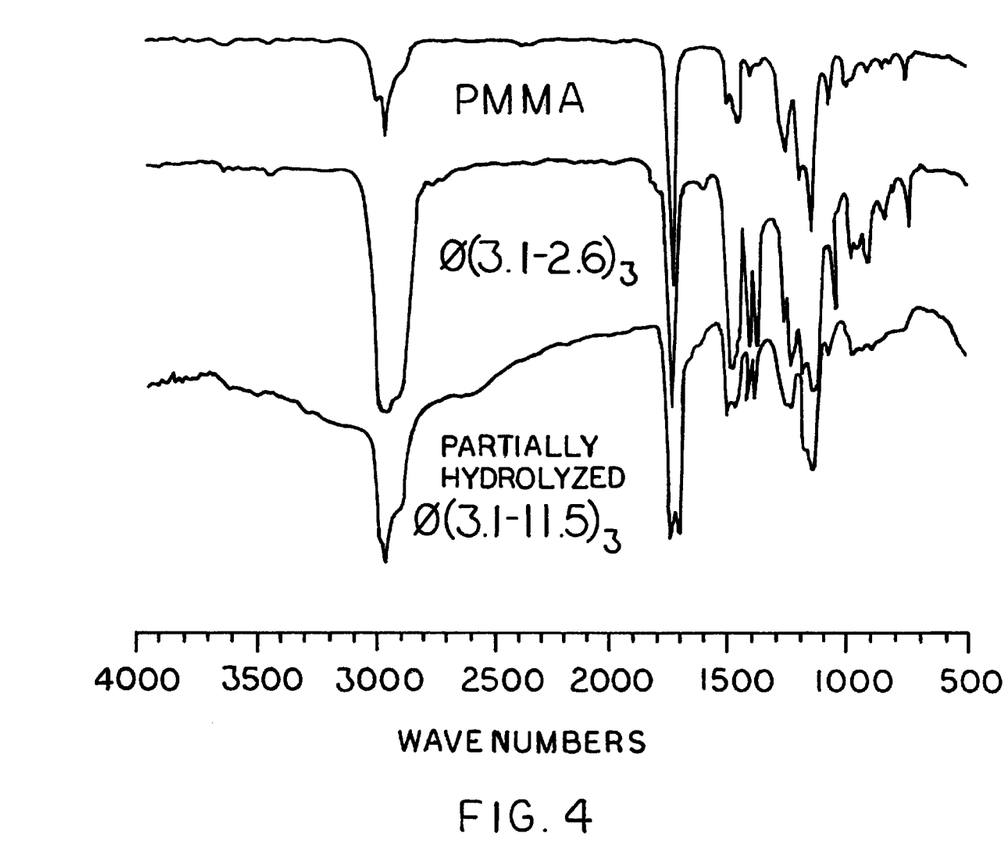
FIG. 4 is the FT-IR spectra of PMMA, $\emptyset(3.1.–2.6)_3$ three arm star polymer, and partially hydrolyzed $\emptyset(3.1.–5)_3$.

FT-IR spectroscopy was also utilized to further elucidate the three arm structure of the thermoplastic star compositions of the present invention. FIG. 4 shows the FT-IR spectrum of a representative Ø(PIB-b-PMMA)$_3$, namely Ø(3.1–2.6)$_3$, and the spectrum of poly(methyl methacrylate) obtained by ATRP having $M_n$=20,700 and $M_w/M_n$=1.28. The absorption at 749 cm$^{-1}$ in both spectra corresponds to the —C(CH$_3$)—Br end group. The increased intensity of the absorptions due to the —CH$_3$ and —CH$_2$— stretching vibrations and —CH$_3$ and —CH$_2$— bending vibrations in the 1360–1490 cm$^{-1}$ and 2800–3000 cm$^{-1}$ regions, respectively, reflects the polyisobutylene content of the star block compositions of the present invention.

TABLE I

| | | | | | PIB % | | | $M_n$ g/mol | | |
| --- | --- | --- | --- | --- | --- | --- | --- | --- | --- | --- |
| Example No. | Star-Blocks | CuX | Time (hr) | Temp. ° C. | in charge | in star block by NMR | Conversion % | Calculated[a] | by GPC | $M_w/M_n$ |
| 1 | Ø-(3.1–11.5)$_3$ | CuBr | 23 | 45 | 13 | 21 | 58 | 70500 | 43700 | 1.54 |
| 2 | Ø-(3.1–7.2)$_3$ | CuBr | 20.5 | 40 | 31 | 36 | ~100 | 29600 | 30900 | 1.50 |
| 3 | Ø-(3.1–2.6)$_3$ | CuCl | 40 | 40 | 61 | 64 | ~100 | 15200 | 17000 | 1.38 |
| 4 | Ø-(5–10.7)$_3$ | CuCl | 67 | 45 | 20 | 31 | 64 | 75000 | 47000 | 1.20 |
| 5 | Ø-(5–8)$_3$ | CuCl | 40 | 40 | 40 | 46 | ~100 | 37500 | 40500 | 1.49 |
| 6 | Ø-(5–3.3)$_3$ | CuBr | 28 | 40 | 60 | 67 | 93 | 24800 | 24800 | 1.61 |
| 7 | Ø-(5–1.9)$_3$ | CuCl | 40 | 40 | 60 | 71 | 88 | 24800 | 20600 | 1.24 |

[a]molecular weights calculated by assuming 100% MMA conversion

The structure of the three arm star compositions of matter of the present invention were characterized by $^1$H-NMR spectroscopy, and the core-destruction technique described by J. P. Kennedy, L. R. Ross and O. Nuyken, Polym. Bull., 5, 5 (1981), the disclosure of which is hereby incorporated by reference.

Figure 1:
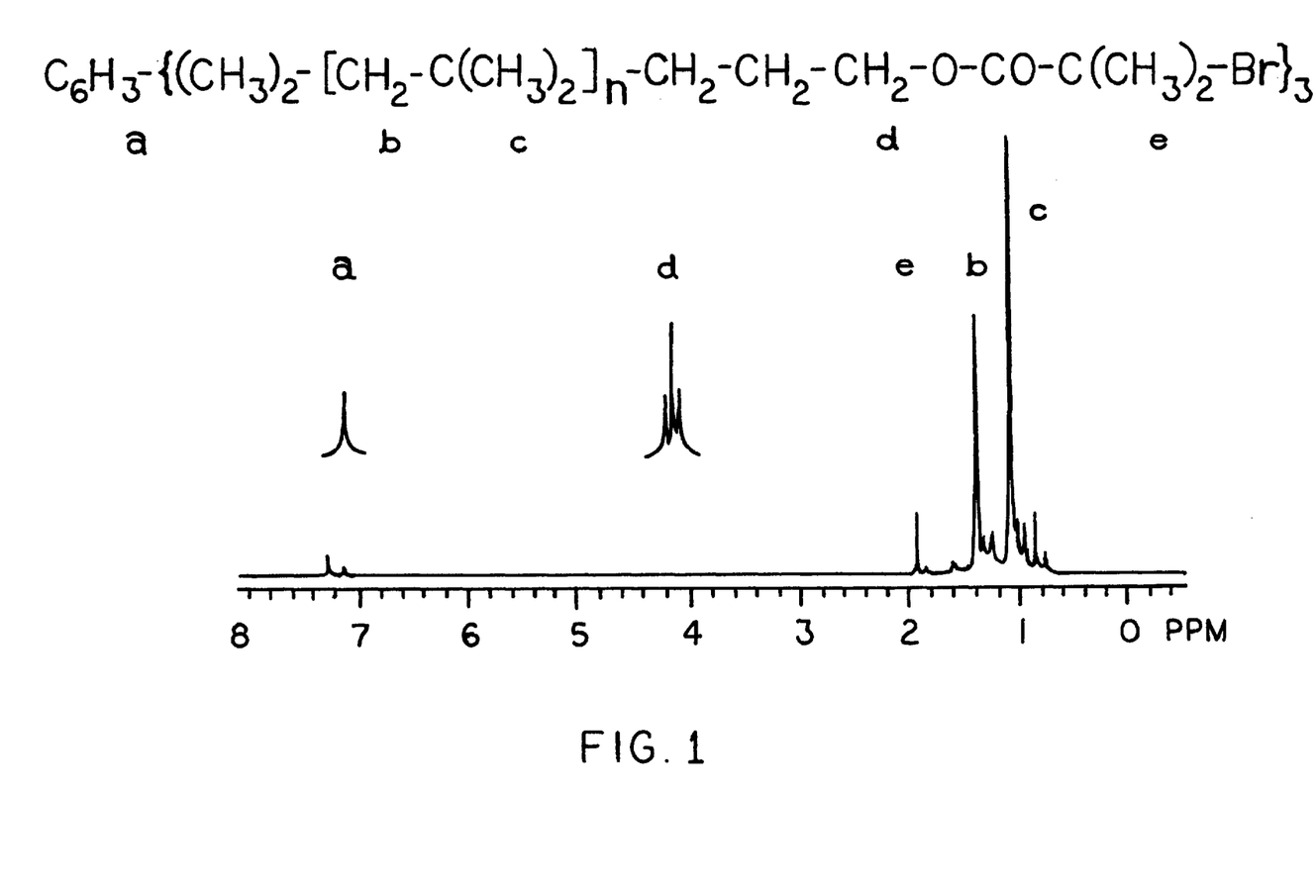
FIG. 1 is the $^1$H-NMR spectrum of a representative three-arm star macroinitiator, namely 2-bromo-isobutyryl-telechelic polyisobutylene (PIB).

FIG. 1 one shows the $^1$H-NMR spectrum of a representative macroinitiator, namely the three arm star 2-bromo-isobutyryl-telechelic polyisobutylene ($M_n$=9,200 g/mol, $M_w/M_n$=1.15). Integration of the —CH$_2$—O— resonance at δ=4.14 relative to that at δ=7.13, associated with three aromatic proton in the core, indicates the intermediary formation of three —OH groups, and relative to that at δ=1.93 proves the presence of three —OCOC(CH$_3$)$_2$Br groups in the macroinitiator.

Swelling Studies

The swelling kinetics of three arm star-block thermoplastic elastomers of the present invention were evaluated. Dried and preweighed samples of partially hydrolyzed star-block polymers were placed in water at room temperature. The samples were periodically withdrawn and weighed. The excess water was removed before weighing each sample by blotting the sample with tissue paper. The swelling kinetics of each sample were obtained by plotting the swelling ratio versus time. The swelling ratio is measured as grams of solvent/gram of dry polymer. The three arm star thermoplastic compositions of the present invention swelled, but did not dissolve, in water. The swelling equilibrium was reached in about 15 hours. The results of the swelling studies indicate that the partially hydrolyzed three arm star thermoplastic compositions of matter of the present invention possess an amphiphilic nature.

Mechanical Properties

The mechanical properties, including tensile strengths and elongations of three arm star-block compositions of the present invention were evaluated. The tensile strength of the three arm star-block elastomers of the present invention was determined by use of an Instron 5567 Tensometer with a 5 kg-load cell and at a crosshead speed of 50 mm/minute, and with a 30 mm clamp separation. The strain of the three arm star-block elastomers of the present invention was determined by use of a Video extensometer at a calculated strain rate of 1.67/minute. According to ASTM test method D638-5, a minimum of five microdumbells were tested. The averages of the stresses and strains were determined and are show in FIG. 5.

elastomers of the present invention was evaluated. The glass transition temperature was determined by differential scanning calorimetry. Samples of the three arm star-block thermoplastic elastomers of the present invention were heated to a temperature of about 20° C. at a rate of about 10° C./minute to remove thermal history effects.

The samples were then cooled to a temperature of about −100° C. The heating and cooling cycles were repeated three times. The thermograms were recorded during the third cycle and were used for the determination of the glass transition temperatures of the three arm star-block elastomers. Thermal degradation of poly(methyl methacrylate) and the three arm star-blocks were evaluated by a thermogravimetric analyzer under $N_2$ by heating the sample elastomers from ambient temperatures to about 500° C. at a rate of about 10° C./minute.

TABLE II

| Star blocks and | $T_g$, ° C. | | Degradation temperature, ° C. |
|---|---|---|---|
| Homopolymers | PIB phase | PMMA phase | 95% |
| Ø(3.1–11.5)$_3$ | −63.7 | 113.6 | 267 |
| Ø(3.1–7.2)$_3$ | −63 | 94.6 | 259 |
| Ø(3.1–2.6)$_3$ | −63.5 | 80.5 | 243 |
| Ø(5–10.7)$_3$ | −60.4 | 109.8 | 258 |
| Ø(5–8)$_3$ | −63.8 | 105.2 | 256 |
| Ø(5–3.3)$_3$ | −62.2 | 93.1 | 244 |
| Ø(5–1.9)$_3$ | −62.8 | 86.3 | 230 |
| PIB | −73[a] | — | 330 |
| PMMA, by ATRP | — | 121.7 | 224 |

[a]Taken from Polymer Handbook, Eds. J. Brandup, E.H. Immergut, Pub. Wiley (1989).

Figure 5:
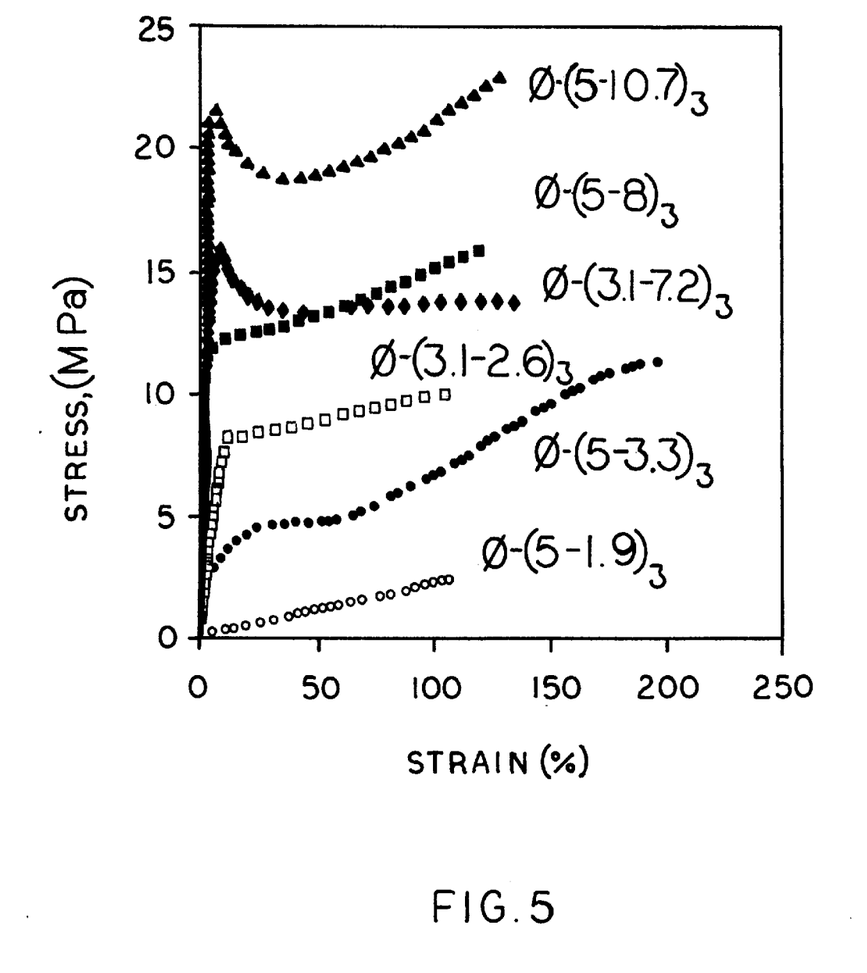
FIG. 5 is a graph of the stress-strain curves of representative $\emptyset(PIB-b-PMMA)_3$ copolymers of the present invention.
Figure 6:
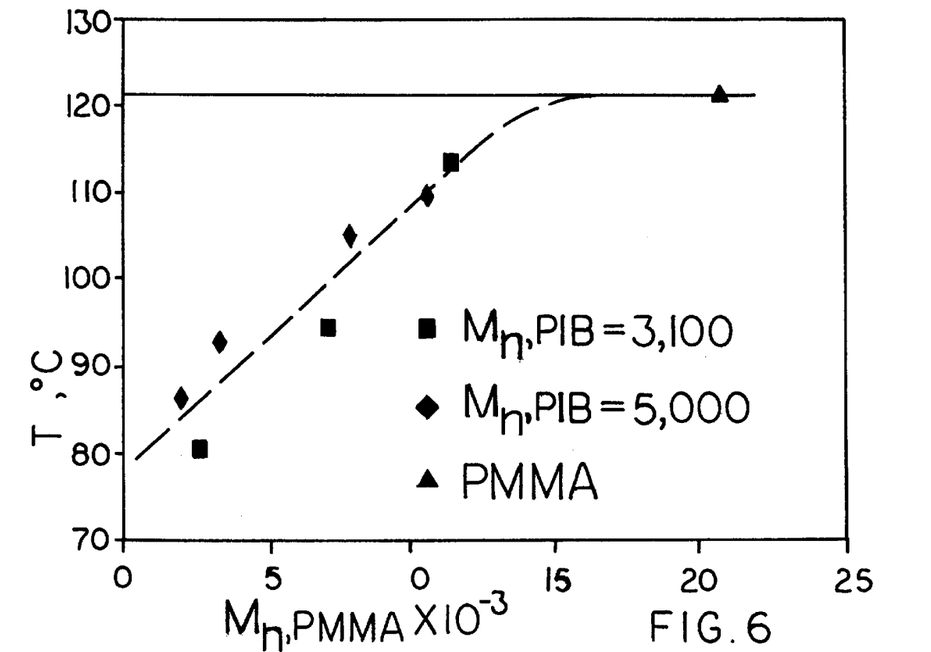
FIG. 6 is a graph depicting the relationship between $M_{n,PMMA}$ and $T_{g,PMMA}$.

FIG. 5 shows the stress-strain properties of two series of the three arm star-block thermoplastic elastomers of the present invention. One series was prepared by using a macroinitiator with a $M_n$=9,200 g/mol. The molecular weight of the polyisobutylene block ($M_{n,PIB}$) in each arm of the three arm star-block thermoplastic elastomer was 3,100 g/mol. Another series was prepared by using a macroinitiator with a $M_n$=15,00 g/mol. The molecular weight of the polyisobutylene block ($M_{n,PIB}$) in each arm of the three arm star-block thermoplastic elastomer was 5,000 g/mol. As FIG. 5 shows, the tensile strengths of the thermoplastic elastomers of the present invention increase with increasing poly(methyl methacrylate) block length in both series of elastomers. Three arm star-block elastomers containing even relatively low molecular weight poly(methyl methacrylate) segments exhibit surprisingly high tensile properties. For example a three arm star-block elastomer having an $M_{n,PMMA}$=10,700 g/mol has a tensile strength of up to about 25 MPa, and an elongation of up to about 250 percent. The mechanical properties of the three-arm star-block elastomers comprising Ø(PIB-b-PMMA)$_3$ are superior to linear thermoplastic elastomers comprising PMMA-b-PIB-b-PMMA. Without being bound to any particular theory, the superior mechanical properties of the three-arm star-block elastomers comprising Ø(PIB-b-PMMA)$_3$ may be a result of the higher degree of interconnectedness of the poly(methyl methacrylate) phases in the star-blocks, and because of the lower sensitivity to linear blocky contaminants.

Thermal Properties

The thermal properties, including the glass transition temperatures ($T_g$), of three arm star-block thermoplastic The glass transition temperatures ($T_g$) and the 95% degradation temperatures ($T_{deg}$) of the three arm star-block compositions of the present invention have been evaluated. Table II, above, shows the DSC and TGA data for the elastomers. As Table II shows, the novel three arm star thermoplastic compositions of matter exhibit a 95% degradation temperature of about 230° C. to about 270° C.

DSC measurements provide convincing evidence for phase separation between the rubbery polyisobutylene and the glassy poly(methyl methacrylate) domains. The glass transition temperatures ($T_{g's}$) in the −62 to −66.5° C. range are associated with the polyisobutylene phase, whereas the glass transition temperatures ($T_{g's}$) in the range of 80.5–113.5° C. show the presence of the poly (methyl methacrylate) phases. Whereas the $T_{g's}$ associated with the poly(methyl methacrylate) phases increase with the molecular weight of the poly(methyl methacrylate) blocks, the $T_{g's}$ of the polyisobutylene phases remain unchanged.

Figure 7:
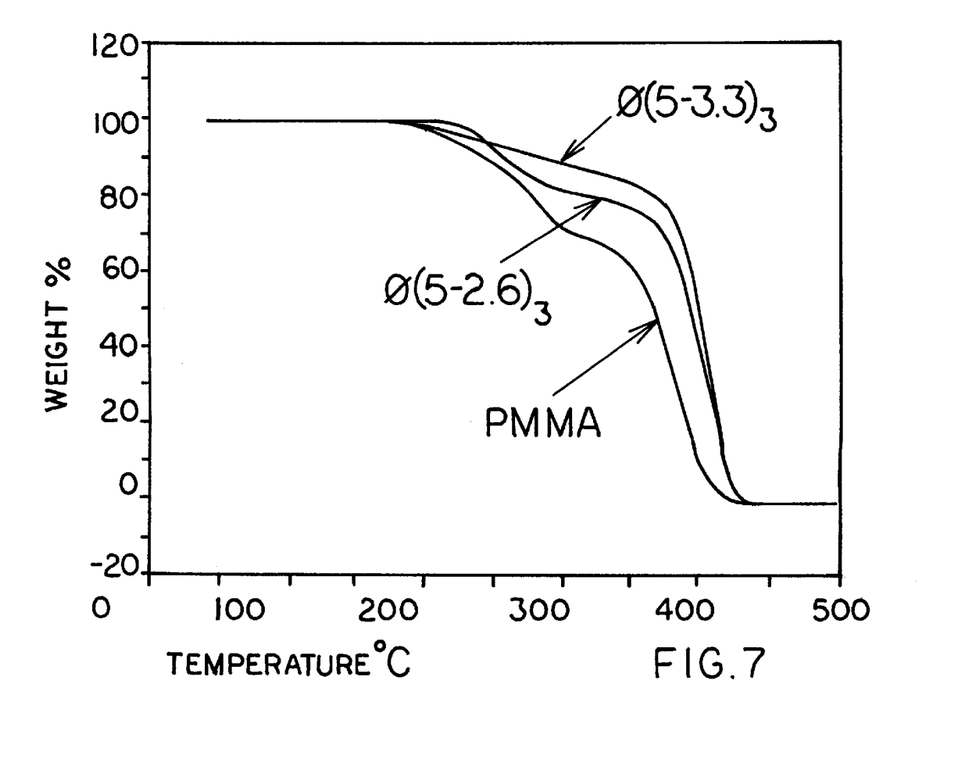
FIG. 7 is a graph depicting traces of $\emptyset(5–2.6)_3$, $\emptyset(5–3.3)_3$ star-blocks and PMMA as measured by TGA.

Table II also shows the 95% degradation temperatures for the three arm star-block thermoplastic elastomers of the present invention, and FIG. 7 shows a representative thermal degradation profile for the three arm star-block elastomers, as compared to a poly(methyl methacrylate) control having a $M_n$=20,700 g/mol and a $M_w/M_n$=1.28. The results indicate that the 95% thermal degradation temperature ($T_{deg}$) of the three arm star-block compositions of the present invention are between the 95% thermal degradation temperatures ($T_{deg's}$) of the polyisobutylene and poly(methyl methacrylate) constituents, but are much closer to the thermally more sensitive poly(methyl methacrylate) constituent.

Based on the foregoing disclosure, it is therefore demonstrated that the objects of the present invention are accomplished by the three arm star compositions and methods of preparation disclosed herein. The three arm star compositions of the present invention are particularly well suited as adhesive and coating compositions. It should be understood that the selection of specific aromatic cores and outer polymer segments can be determined by one having ordinary skill in the art without departing from the spirit of the invention herein disclosed and described. It should therefore be appreciated that the present invention is not limited to the specific embodiments described above, but includes variations, modifications and equivalent embodiments defined by the following claims.

We claim:

1. A composition of matter comprising:

a trifunctional aromatic core, said core having three arms radiating therefrom, wherein each of said arms is a diblock copolymer comprising an inner segment of polyisobutylene connected to an outer segment obtained by a living radical polymerization process.

2. The composition of claim 1, wherein the outer segment is a polymer selected from the group consisting of polyacrylates, polymethacrylates and polyacrylonitrile, polymethacrylonitrile.

3. The thermoplastic composition of matter of claim 1, comprising a trifunctional aromatic core, said core having three arms radiating therefrom, wherein each of said arms is a diblock copolymer comprising an inner segment of polyisobutylene connected to outer polymer segment, the composition represented by Formula (I):

(I)

wherein $R_1$–$R_6$ are each independently selected from the group consisting of hydrogen, methyl, ethyl and phenyl;

wherein A connects the inner segments of polyisobutylene to the outer polymer segments and is selected from (II)

and (III)

wherein $R_7$ is selected from at least one of hydrogen and methyl;

and wherein B represents the outer polymer segments, wherein the outer segment of each arm is a polymer selected from the group consisting of polyacrylates, polymethacrylates, polyacrylonitrile, and polymethacrylonitrile.

4. The composition of matter of claim 1, wherein the outer polymer segment of each arm is a polymethacrylate.

5. The composition of matter of claim 4, wherein the polymethacrylate is poly(methyl methacrylate).

6. The thermoplastic composition of matter of claim 1, wherein said composition has a tensile strength of up to about 25 Mpa.

7. The thermoplastic composition of matter of claim 1, wherein said composition has an elongation of up to about 250%.

8. A thermoplastic elastomer comprising the composition of claim 1.

9. An adhesive composition comprising the composition of matter of claim 1.

10. A coating composition comprising the composition of matter of claim 1.

11. A process of preparing a composition of matter comprising the steps of:

providing a trifunctional aromatic core;

reacting the trifunctional aromatic core with isobutylene to form a macroinitiator having three arms, said macroinitiator comprising polyisobutylene functionalized at the terminus of each arm;

conducting site transformation at the terminus of each arm to introduce a group capable of initiating living radical polymerization of outer polymer segments at the terminus of each arm;

performing living radical polymerization to form the outer polymer segments at the terminus of each arm, thereby producing a three arm star composition of matter having three diblock copolymer arms.

12. The process of claim 11, wherein the outer segment of each arm is a polymer selected from the group consisting of polyacrylates, polymethacrylates, polyacrylonitrile, polymethacrylonitrile, and polystyrenes.

13. The process of claim 12, wherein the outer segment of each arm is a polymethacrylate.

14. The process of claim 13, wherein the polymethacrylate is poly(methyl methacrylate).

15. The process of claim 11, wherein the group capable of initiating free radical polymerization of outer polymer segments at the terminus of each arm is 2-bromo-isobutyryl bromide.

16. A thermoplastic elastomer produced by the process of claim 11.

17. An adhesive produced by the process of claim 11.

18. A coating produced by the process of claim 11.

* * * * *